United States Patent
Gupta

(10) Patent No.: US 10,375,705 B2
(45) Date of Patent: Aug. 6, 2019

(54) WIRELESS LOCAL AREA NETWORK (WLAN) CONNECTIVITY OPTION DISCOVERY

(71) Applicant: Intel IP Corporation, Santa Clara, CA (US)

(72) Inventor: Vivek Gupta, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 516 days.

(21) Appl. No.: 14/485,002

(22) Filed: Sep. 12, 2014

(65) Prior Publication Data

US 2015/0117425 A1    Apr. 30, 2015

Related U.S. Application Data

(60) Provisional application No. 61/898,425, filed on Oct. 31, 2013.

(51) Int. Cl.
*H04W 48/16* (2009.01)
*H04W 48/20* (2009.01)
(Continued)

(52) U.S. Cl.
CPC .......... *H04W 72/10* (2013.01); *H04B 17/318* (2015.01); *H04J 3/1694* (2013.01);
(Continued)

(58) Field of Classification Search
CPC . H04W 72/10; H04W 24/10; H04W 28/0215; H04W 28/08; H04W 36/0055;
(Continued)

(56) References Cited

U.S. PATENT DOCUMENTS

2005/0254469 A1 * 11/2005 Verma et al. ................. 370/338
2009/0098872 A1 * 4/2009 Deshpande et al. ....... 455/435.2
(Continued)

FOREIGN PATENT DOCUMENTS

| CN | 103228039 A | 7/2013 |
|---|---|---|
| WO | 2013042330 A1 | 3/2013 |

OTHER PUBLICATIONS

International Search Report and Written Opinion of the International Searching Authority, for International Application No. PCT/US2014/062811 dated Jan. 21, 2015.
(Continued)

*Primary Examiner* — Edan Orgad
*Assistant Examiner* — Vanneilian Lalchinthang
(74) *Attorney, Agent, or Firm* — Schwabe, Williamson & Wyatt, P.C.

(57) ABSTRACT

In embodiments, apparatuses, methods, and storage media may be described for identifying a wireless local area network (WLAN) access point (AP) with which a third generation partnership project (3GPP) user equipment (UE) should connect. Specifically, the UE may receive an indication of one or more supported connectivity options of the WLAN AP. The UE may also receive an indication of one or more public land mobile networks that the WLAN AP is able to communicate with. The UE may then select whether the UE should connect to the WLAN AP based on the received indication(s) and a selection preference rule. Other embodiments may be claimed.

13 Claims, 7 Drawing Sheets

(51) Int. Cl.
| | |
|---|---|
| H04L 12/803 | (2013.01) |
| H04W 72/10 | (2009.01) |
| H04W 76/18 | (2018.01) |
| H04W 76/10 | (2018.01) |
| H04W 76/19 | (2018.01) |
| H04W 76/15 | (2018.01) |
| H04W 24/10 | (2009.01) |
| H04W 48/06 | (2009.01) |
| H04W 74/00 | (2009.01) |
| H04W 72/04 | (2009.01) |
| H04W 48/08 | (2009.01) |
| H04W 48/18 | (2009.01) |
| H04W 28/02 | (2009.01) |
| H04W 48/12 | (2009.01) |
| H04W 36/00 | (2009.01) |
| H04W 4/02 | (2018.01) |
| H04W 8/00 | (2009.01) |
| H04W 52/34 | (2009.01) |
| H04W 56/00 | (2009.01) |
| H04B 17/318 | (2015.01) |
| H04W 74/08 | (2009.01) |
| H04W 72/08 | (2009.01) |
| H04W 8/06 | (2009.01) |
| H04W 8/18 | (2009.01) |
| H04W 60/00 | (2009.01) |
| H04W 60/02 | (2009.01) |
| H04J 3/16 | (2006.01) |
| H04L 5/00 | (2006.01) |
| H04W 28/08 | (2009.01) |
| H04W 4/60 | (2018.01) |
| H04W 76/14 | (2018.01) |
| H04W 4/80 | (2018.01) |
| H04W 92/20 | (2009.01) |
| H04W 84/12 | (2009.01) |
| H04W 88/08 | (2009.01) |
| H04W 88/02 | (2009.01) |
| H04W 88/16 | (2009.01) |
| H04B 7/0413 | (2017.01) |
| H04W 8/04 | (2009.01) |
| H04W 88/18 | (2009.01) |

(52) U.S. Cl.
CPC .............. *H04L 5/0007* (2013.01); *H04W 4/02* (2013.01); *H04W 4/023* (2013.01); *H04W 4/60* (2018.02); *H04W 4/80* (2018.02); *H04W 8/005* (2013.01); *H04W 8/06* (2013.01); *H04W 8/183* (2013.01); *H04W 24/10* (2013.01); *H04W 28/0215* (2013.01); *H04W 28/08* (2013.01); *H04W 36/0055* (2013.01); *H04W 36/0069* (2018.08); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/10* (2018.02); *H04W 76/14* (2018.02); *H04W 76/15* (2018.02); *H04W 76/18* (2018.02); *H04W 76/19* (2018.02); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/16* (2013.01); *H04W 88/18* (2013.01); *H04W 92/20* (2013.01); *Y02D 70/126* (2018.01)

(58) Field of Classification Search
CPC .. H04W 36/0069; H04W 4/02; H04B 17/318; H04J 3/1694; H04L 5/0007
USPC .......................................................... 370/338
See application file for complete search history.

(56) References Cited

U.S. PATENT DOCUMENTS

| | | | |
|---|---|---|---|
| 2010/0118847 A1* | 5/2010 | Lee et al. ....................... | 370/338 |
| 2010/0296415 A1 | 11/2010 | Sachs et al. | |
| 2011/0072101 A1* | 3/2011 | Forssell et al. ............... | 709/206 |
| 2012/0196644 A1* | 8/2012 | Scherzer et al. ............. | 455/524 |
| 2012/0309447 A1 | 12/2012 | Mustajarvi et al. | |
| 2013/0100932 A1 | 4/2013 | Yu et al. | |
| 2013/0267203 A1* | 10/2013 | Qiang ................... | H04W 48/18 455/411 |
| 2013/0308531 A1* | 11/2013 | So ....................... | H04W 76/022 370/328 |
| 2014/0071967 A1* | 3/2014 | Velasco ............... | H04L 12/1403 370/338 |
| 2014/0233544 A1* | 8/2014 | McCann ............... | H04W 48/18 370/338 |
| 2014/0287746 A1* | 9/2014 | Faccin .................. | H04W 48/18 455/433 |
| 2015/0063331 A1* | 3/2015 | Scahill ................ | H04L 63/0892 370/338 |
| 2016/0065478 A1* | 3/2016 | Jeong .................... | H04L 47/125 370/235 |

OTHER PUBLICATIONS

European Patent Office; Extended European Search Report issued for Patent Application No. 14858479.0 dated Jun. 21, 2017; 11 pages.

Qualcomm Incorporated; "Enhancements to solution 16 for key issue 9 and selection of solution 16," SA WG2 Meeting S2#99, S2-133454; Sep. 23-27, 2013, Xiamen, China; 4 pages.

3GPP TR 23.865 V12.0.0 (Sep. 2013); "Technical Specification Group Services and System Aspects; Study on Wirelss Local Area Network (WLAN) network selection for 3GPP terminals; Stage 2 (Release 12)," 45 pages.

European Patent Office—Article 94(3) dated May 23, 2019 from European Patent Application No. 14858479.0, 3 pages.

* cited by examiner

WIRELESS LOCAL AREA NETWORK (WLAN) CONNECTIVITY OPTION DISCOVERY

CROSS REFERENCE TO RELATED APPLICATION

The present application claims priority to U.S. Provisional Patent Application No. 61/898,425, filed Oct. 31, 2013, entitled "Advanced Wireless Communication Systems and Techniques," the entire disclosure of which is hereby incorporated by reference in its entirety.

FIELD

Embodiments of the present invention relate generally to the technical field of wireless local area network (WLAN) selection.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

A WLAN may be able to attach to a third generation partnership project (3GPP) evolved packet core (EPC), which may be a core network of a long term evolution (LTE) network or system. Depending on how the WLAN attaches to the 3GPP EPC, the WLAN may obtain different kinds or types of connectivity such as over a trusted interface, an untrusted interface, non-seamless offload or local breakout, etc.

If the WLAN network is in a visited domain of the LTE network, then the WLAN network may be able to provide several value added services such as Internet connectivity, Voice over Internet Protocol Multimedia Subsystem (VoIMS), or other services. In some cases, a network operator or user of a user equipment (UE) may want to ensure that the UE may be able to select a WLAN that can also provide home routed services such as a corporate virtual private network (VPN), secure banking transactions, or other home routed services such as parental control.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In embodiments, apparatuses, methods, and storage media may be described for identifying a WLAN AP with which a 3GPP UE should connect. Specifically, the UE may receive an indication of one or more supported connectivity options of the WLAN AP. The connectivity options may include, for example, a trusted S2a interface, an untrusted S2b interface, a non-seamless WLAN offload (NSWO) interface or local breakout, or some other interface. The UE may also receive an indication of one or more PLMNs that the WLAN AP is able to communicate with over the connectivity options. Specifically, the indication may include information regarding whether the PLMN is a home PLMN (HPLMN) or a visited PLMN (VPLMN), and whether the PLMN is able to provide home routed services or visited services as described in further detail below. The UE may then select whether the UE should connect to the WLAN AP based on the received indication(s) and a selection preference rule. The selection preference rule may be a rule provisioned by an ANDSF of an HPLMN or VPLMN. Other embodiments may be claimed.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments a module may be a distinct circuit, while in other embodiments a module may include a plurality of circuits.

Figure 1:
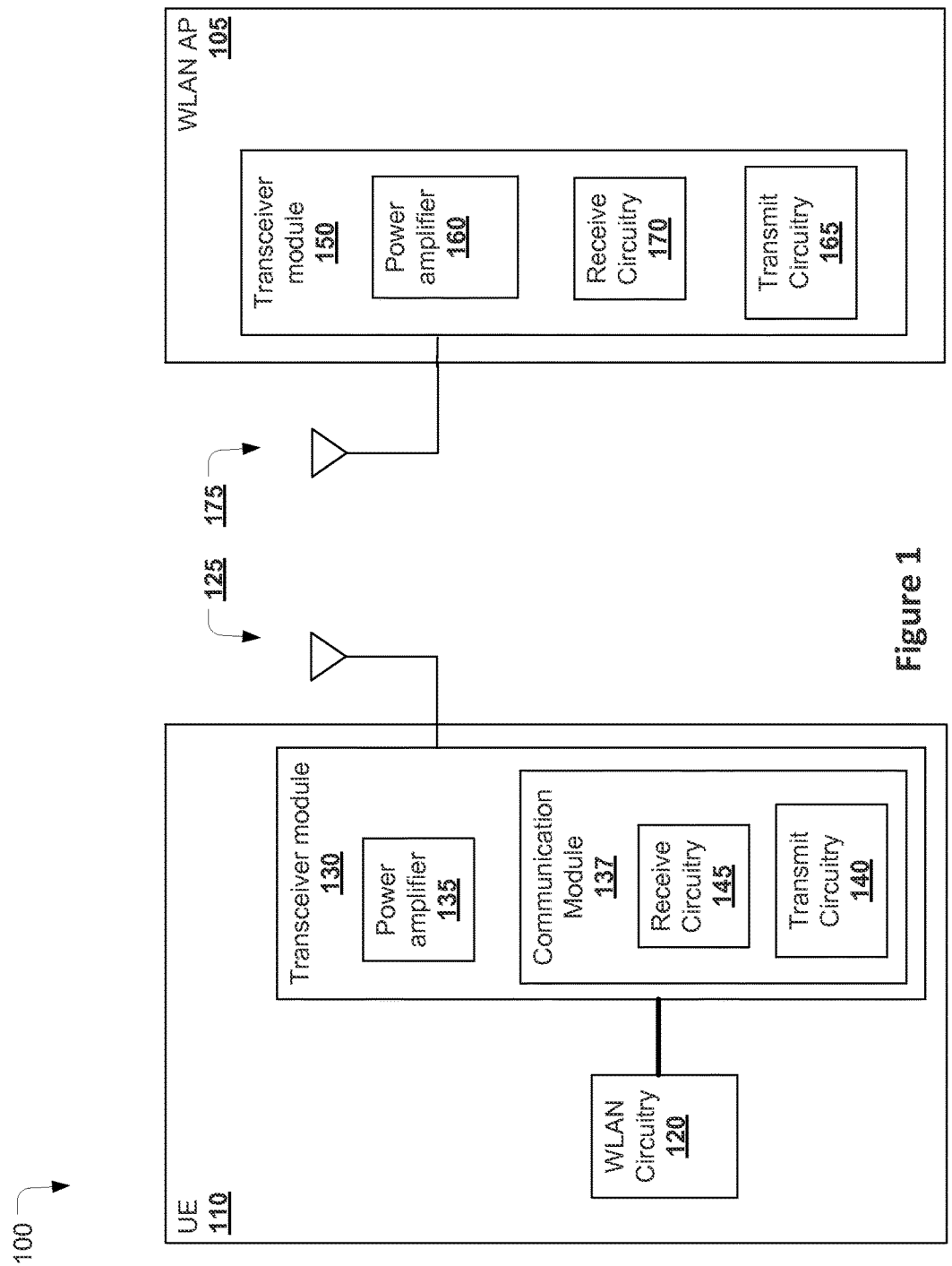
FIG. 1 schematically illustrates a high-level example of a network comprising a UE and a WLAN access point (AP), in accordance with various embodiments.

FIG. 1 schematically illustrates a wireless communication network 100 (hereinafter "network 100") in accordance with various embodiments. The network 100 may include a UE 110 that is communicatively coupled with a WLAN AP 105. In embodiments, the network 100 may be a WLAN such as a WiFi network described by one or more of the Institute of Electrical and Electronics Engineers (IEEE) 802.11 standards and the WLAN AP 105 may be considered a WiFi Access Point (AP). In some embodiments, the network 100 may be some other type of WLAN.

As shown in FIG. 1, the UE 110 may include a transceiver module 130, which may also be referred to as a multi-mode transceiver chip. The transceiver module 130 may be configured to transmit and receive signals using one or more protocols such as long term evolution (LTE) and/or WiFi. Specifically, the transceiver module 130 may be coupled with one or more of a plurality of antennas 125 of the UE 110 for communicating wirelessly with other components of the network 100, e.g., WLAN AP 105 or another UE. The antennas 125 may be powered by a power amplifier 135 which may be a component of the transceiver module 130 as shown in FIG. 1, or coupled with the transceiver module 130. In one embodiment, the power amplifier 135 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 130 may include a communication module 137, which may be referred to as a broadband module, which may contain both transmit circuitry 140 configured to cause the antennas 125 to transmit one or more signals from the UE 110, and receive circuitry 145 configured to process signals received by the antennas 125. In other embodiments, the communication module 137 may be implemented in separate chips or modules, for example, one chip including the receive circuitry 145 and another chip including the transmit circuitry 140. In some embodiments, the transmitted or received signals may be WLAN signals transmitted to or received from a WLAN AP. In other embodiments the signals may be cellular signals transmitted to or received from a 3GPP evolved NodeB (eNB). In some embodiments, the transceiver module 130 may include or be coupled with a WLAN circuitry 120 to identify one or more WLANs or WLAN APs with which the UE 110 should connect, as described in further detail below. The WLAN circuitry 120 may also be configured to process or generate signals to be transmitted over antennas 125, for example, by transceiver module 130, communication module 137, and/or transmit circuitry 140.

Similar to the UE 110, the WLAN AP 105 may include a transceiver module 150. The transceiver module 150 may be further coupled with one or more of a plurality of antennas 175 of the WLAN AP 105 for communicating wirelessly with other components of the network 100, e.g., UE 110. The antennas 175 may be powered by a power amplifier 160 which may be a component of the transceiver module 150, as shown in FIG. 1, or may be a separate component of the WLAN AP 105. In one embodiment, the power amplifier 160 may provide the power for all transmissions on the antennas 175. In other embodiments, there may be multiple power amplifiers on the WLAN AP 105. The use of multiple antennas 175 may allow for the WLAN AP 105 to use transmit diversity techniques such as SORTD, MIMO, or FD-MIMO. In certain embodiments the transceiver module 150 may contain both transmit circuitry 165 configured to cause the antennas 175 to transmit one or more signals from the WLAN AP 105, and receive circuitry 170 to process signals received by the antennas 175. In other embodiments, the transceiver module 150 may be replaced by transmit circuitry 165 and receive circuitry 170 which are separate from one another (not shown). In some embodiments, though not shown, the transceiver module 150 may include a communication module such as communication module 137 that includes the receive circuitry 170 and the transmit circuitry 165.

As described above, a WLAN and particularly a WLAN AP that serves as an AP for a WLAN network may be able to attach to the EPC of a 3GPP network such as an LTE network in a variety of ways. For example, the WLAN AP may attach to the 3GPP EPC via a variety of interfaces such as an S2a interface, an S2b interface, a local break out (LBO) interface, an NSWO interface, or some other interface. Generally, an S2a interface may be an interface for connecting trusted WLANs that may use relatively robust security measures or protocols to the EPC. An S2b interface may be an interface for connecting untrusted WLANs that may use less robust security measures or authentication protocols, or no security measures or protocols to the EPC.

In some embodiments, to ensure seamless continuity in different scenarios for services that may require Internet Protocol (IP) address preservation such as VoIMS or other services, the UE 110 may be provisioned with an active inter-system routing policy (ISRP) rule that may include a direction or indication to the UE 110 to select a WLAN AP such as WLAN AP 105 with which the UE 110 should couple. Specifically, the ISRP rule may be provisioned by either a home ANDSF (H-ANDSF) or a visited ANDSF (V-ANDSF). However, in some cases, if the ISRP is provisioned by a V-ANDSF, the V-ANDSF may not ensure that the selected WLAN has connectivity with a packet data network gateway (PDN-GW) of the HPLMN of the UE 110. Generally, a PDN-GW may act as a mobility point between 3GPP and non-3GPP technologies such as a WLAN. In some cases if the network operator or user of the UE 110 wants to access services provided by the UE's HPLMN such as banking or some other services, the ISRP provisioned by the V-ANDSF may not ensure that the WLAN has connectivity with the HPLMN and the UE 110 may not be able to access the home service.

In embodiments described herein, it may be desirable for a UE such as UE 110 to be able to identify connectivity options supported by a given WLAN AP such as WLAN AP 105. It may also be desirable for information to be provided to the UE 110 or the user of UE 110 regarding what home routed services, if any, are available through a given WLAN AP. If home routed services are available, it may be desirable to be able to identify which services are available, and which connectivity options a given service is available through. It may also be desirable for a network operator of either the HPLMN or VPLMN to be able to specify policies for the UE 110 to use in selecting which WLAN AP to couple with to use a given home routed service. It may be useful for the above information to be provided in either a roaming or non-roaming scenario.

Figure 2:
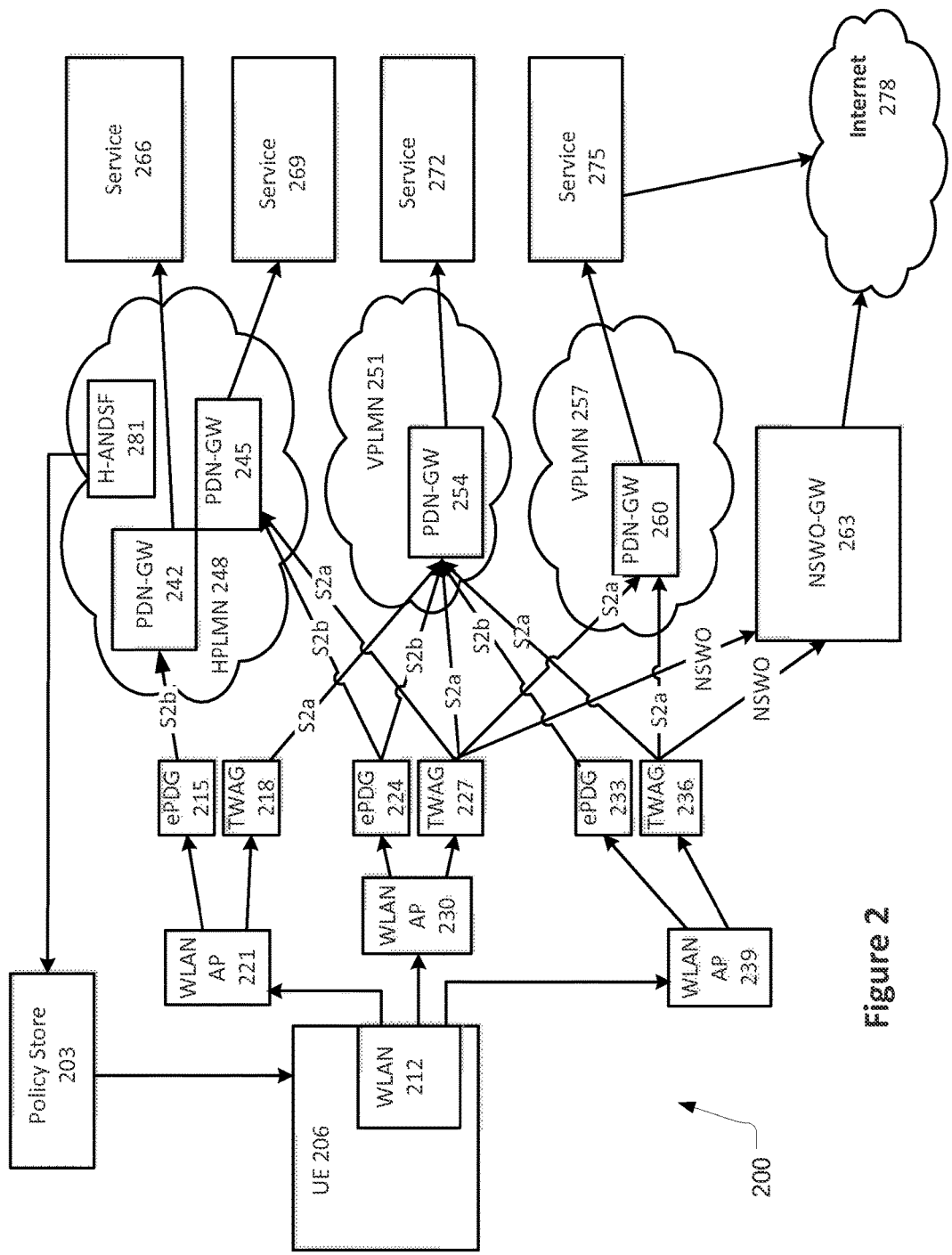
FIG. 2 schematically illustrates a high-level example of a network comprising a UE, a plurality of public land mobile networks (PLMNs), and a plurality of WLAN access points (APs), in accordance with various embodiments.

FIG. 2 depicts an example network 220 that may include a UE 206 with a WLAN module 212, which may be similar to UE 110 and WLAN circuitry 120, respectively. The UE 206 may be within range of, and able to connect with, WLAN APs 221, 230, and 239, which may be similar to WLAN AP 105. Each of WLAN APs 221, 230, and 239 may include or be communicatively coupled with an evolved packet data gateway (ePDG) 215, 224, and 233 through which the WLAN APs 221, 230, and 239 can access a variety of S2b interfaces, as shown. Additionally, each of WLAN APs 221, 230, and 239 may include or be communicatively coupled with a trusted wireless access gateway (TWAG) such as TWAGs 218, 227, and 236. Generally, the TWAGs 218, 227, and 236 may be able to communicate with one or more PDN-GWs of an HPLMN or one or more VPLMNs via an S2a interface. As noted above, the S2a interface may be considered an interface for connecting trusted WLANs that may use relatively robust security measures or protocols to the EPC. In some embodiments, the TWAGs such as TWAGs 227 or 236 may be able to communicate with an NSWO gateway (NSWO-GW) 263 via an NSWO interface. ePDGs 215, 224, or 233 may be able to communicate with one or more PDN-GWs of an HPLMN or one or more VPLMNs via an S2b interface. As noted above, the S2b interface may be considered an interface for connecting untrusted WLANs that may use less robust security measures or authentication protocols, or no security measures or protocols, to the EPC.

Specifically, WLAN AP 221 may be configured to communicate with PDN-GW 242 of HPLMN 248 by using an S2b interface through the ePDG 215. PDN-GW 242 may be configured to provide a service 266 that may be, for example, a voice over LTE (VoLTE) service or a VoLTE access point name (APN). As used herein, an APN may be considered a gateway or pointer to access a specific functionality or service. Therefore, as described above, the PDN-GW 242 may itself provide a VoLTE service, or the PDN-GW 242 may include a pointer to one or more separate processor(s), server(s), or devices that provide or facilitate a VoLTE service.

WLAN AP 221 may be further configured to communicate with PDN-GW 254 of VPLMN 251 by using an S2a interface through the TWAG 218. PDN-GW 254 may be configured to provide another service 272 such as a video on demand (VoD) service or a VoD APN.

Similarly, WLAN AP 230 may be configured to communicate with PDN-GW 245 of HPLMN 248 by using an S2b interface through the ePDG 224 or an S2a interface through the TWAG 227. The PDN-GW 245 may be configured to provide a service 269 that may be, for example, an IP multimedia subsystem (IMS) service or an IMS APN. WLAN AP 230 may be further configured to communicate with PDN-GW 254 of VPLMN 251 by using an S2b interface through ePDG 224 or an S2a interface through TWAG 227. As noted above, PDN-GW 254 may be configured to provide another service 272 such as a VoD service or a VoD APN. WLAN AP 230 may be further configured to communicate with PDN-GW 260 of VPLMN 257 through an S2a interface of TWAG 227. PDN-GW 260 may be configured to provide another service 275 such as an Internet APN. Specifically, PDN-GW 260 may be communicatively coupled with one or more servers, devices, or elements of the Internet 278. Finally, WLAN AP 230 may be configured to communicate with NSWO-GW 263 via an NSWO interface through TWAG 227. In embodiments, the NSWO-GW 263 may also be communicatively coupled with one or more servers, devices, or elements of the Internet 278.

Similarly, WLAN AP 239 may be configured to communicate with PDN-GW 254 of VPLMN 251 through an S2b interface of ePDG 233 or an S2a interface of TWAG 236. As noted above, PDN-GW 254 may be configured to provide a service 272 that may be, for example, a VoD service or a VoD APN. WLAN AP 239 may be further configured to communicate with PDN-GW 260 of VPLMN 257 through an S2a interface of TWAG 236. PDN-GW 260 may be configured to provide a service 275 such as the Internet APN described above. WLAN AP 239 may also be configured to communicate with NSWO-GW 263 through an NSWO interface of TWAG 236, as described above. As noted above, the NSWO-GW 263 may also be communicatively coupled with one or more servers, devices, or elements of the Internet 278.

In some embodiments, the HPLMN 248 may further include or be coupled with an H-ANDSF 281. As describe above, the H-ANDSF 281 may be configured to provide one or more selection preference rules such as an ISRP rule, an inter-system mobility policy (ISMP) rule, a WLAN selection policy (WLANSP) rule, or some other type of selection preference rule to the UE 206 that the UE 206 may use to select a WLAN AP with which the UE 206 should couple. In embodiments, the H-ANDSF 281 may store or provision the selection preference rule(s) in a policy store 203. In some embodiments, the policy store 203 may be part of the H-ANDSF 281 or HPLMN 248. In other embodiments, the policy store 203 may be part of the UE 206. In other embodiments, the policy store 203 may be separate from, but communicatively coupled with, the UE 206 and the H-ANDSF as shown in FIG. 2. In some embodiments, one or more of the selection preference rule(s) may be provisioned from a visited ANDSF (V-ANDSF) of a VPLMN such as VPLMNs 251 or 257 (not shown). In those embodiments, the selection preference rule(s) received from the H-ANDSF 281 may take precedence over a selection preference rule received from a V-ANDSF.

The different services, the number of PLMNs, the number of WLAN APs, the connectivity options of the WLAN APs, and other aspects of FIG. 2 are intended as being an example of one embodiment of the present disclosure. In other embodiments, one or more other elements such as WLAN APs, PLMNs, etc. may be present in network 200, and the WLAN APs may be able to access the different PDN-GWs via different connectivity options than those shown in FIG. 2.

In some cases, services that are provided through PDN-GWs of the HPLMN 248 such as PDN-GWs 242 and 245 may be referred to as "home routed" services. Specifically, as shown in FIG. 2, services 266 and 269 may be considered to be home routed services. Services 272 and 275, which are not accessed through PDN-GWs 242 and 245 of HPLMN 248 may not be considered to be home routed services, and instead may be considered "visited" services. As shown in FIG. 2, WLAN APs 221 and 230 may have access to home routed services 266 and 269, while WLAN AP 239 may not have access to home routed services.

As an example use case, the services usage over different WLAN networks, or over WLAN networks and LTE networks, may be charged differently by a network operator of the WLAN network, the LTE network, or some other network operator. For example, an operator may operate such that a VoD service over WLAN is a subscribed service where the user of the UE 206 may pay a flat fee (e.g., $10 a month) to have unlimited access to VoD over WLAN for free, or to have access to VoD over WLAN with a much lower price per minute than over a 3GPP network such as an LTE network. The operator may extend this difference in charging or access structure to other services and/or service APNs.

In embodiments, a network operator of the HPLMN 248, and particularly the H-ANDSF 281, may provide a selection preference rule such as an ISRP rule that indicates that the UE 206 should preferentially connect to a WLAN AP such as WLAN AP 221 that is able to provide services such as services 266, 269, 272, or 275 via an S2b interface. Specifically, the indication may include an indication that the UE 206 should prefer home routed services 266 and 269. These indications may be made with a flag such as "PreferHomeRoutedWLANs_S2b," though other flags or flag names may be used in other embodiments. This indication may depend, for example, on whether the user of UE 206 has subscribed to operator services such as VoLTE or some other service that may not require a highly secure trusted connection via a WLAN.

In other embodiments, the network operator of the HPLMN 248, and particularly the H-ANDSF 281, may provide a selection preference rule such as an ISRP rule that indicates that the UE 206 should preferentially connect to a WLAN AP such as WLAN AP 221 that is able to access one or more services such as services 266, 269, 272, or 275 via an S2a interface. Specifically, the indication may include an indication that the UE 206 should prefer WLAN APs such as WLAN APs 221 and 230 that are able to provide home routed services 266 and 269. These indications may be made with a flag such as "PreferHomeRoutedWLANs_S2a," though other flags or flag names may be used in other embodiments. This indication may depend on whether the user of the UE 206 is authorized, or UE 206 is configured, to use IMS services such as VoIMS or some other service that may benefit from a trusted, relatively secure S2a connection via WLAN. In other cases, the network operator of the HPLMN 248, and particularly the H-ANDSF 281, may provide a selection preference rule that the UE 206 should connect to the NSWO-GW 263.

In order to implement the selection preference rule, it may be desirable for the UE 206, or the user of UE 206, to identify what sort of connectivity options (e.g. S2a, S2b, NSWO, etc.) are supported by a given WLAN or WLAN AP. Further, it may be desirable for the UE 206, or the user of UE 206, to identify what services are provided or accessible via the different WLAN APs, and whether those services are home routed services or visited services. Finally, it may be desirable for the UE 206, or the user of UE 206, to identify which connectivity option is available for a given home routed or visited service (e.g., if the service is accessible via an S2a interface, an S2b interface, an NSWO interface, etc.)

In some embodiments, the WLAN APs 221, 230, and 239 may advertise through one or more Institute of Electrical and Electronics Engineers (IEEE) 802.11 beacons the connectivity options supported (e.g. S2a, S2b, NSWO) by each WLAN AP. The UE 206 may receive the one or more 802.11 beacons and identify which one(s) of the WLAN APs 221, 230, and 239 satisfy the connectivity option parameter(s) of the selection preference rule(s).

In response to identifying the different connectivity options of each of the WLAN APs 221, 230, and 239, the UE 206 may then attempt to identify which PLMN is supported through one or more of the connectivity options of the WLAN APs 221, 230, or 239, and whether that PLMN has access to home routed services or visited services. For example, in some embodiments the 802.11 beacons may include one or more indications about which PLMNs are supported through an S2a interface of the WLAN AP, an S2b interface of the WLAN AP, a NSWO interface of the WLAN AP, etc. In embodiments, these indications may take the form of one or more information elements (IEs) as described in further detail below.

In other embodiments, the UE 206 may transmit a query such as an access network query protocol (ANQP) query to one or more of the WLAN APs 221, 230, or 239 regarding which PLMNs the various WLAN APs can connect to, and whether those PLMNs offer home routed services or visited services. The ANQP query may include a generic WLAN container through which the UE 206 may request one or more parameters or information about which PLMNs are supported through an interface such as an S2a interface, S2b interface, NSWO interface, etc. The WLAN AP that receives the ANQP query may respond with an ANQP response that may include the requested information or parameters. The generic WLAN container is discussed in greater detail below.

In other embodiments, the UE 206 may use a protocol such as a WLAN Control Protocol (WLCP) to query the TWAGs 218, 227, or 236 of WLAN APs 221, 230, or 239 about PLMNs that are reachable through the TWAGs 218, 227, or 236, and whether the services those PLMNs provide are home routed or visited. The TWAGs 218, 227, or 236 may in turn query WLANs, WLAN APs, or WLAN operators to obtain this information related to the PLMNs, or the information may be pre-provisioned in the TWAGs 218, 227, or 236. In some cases, the WLCP may be expanded to include additional messages that could be used to carry this query. In some embodiments, the TWAGs 218, 227, or 236 may be co-located with a WLAN access network, and so could easily obtain the information related to the PLMNs.

Figure 3:
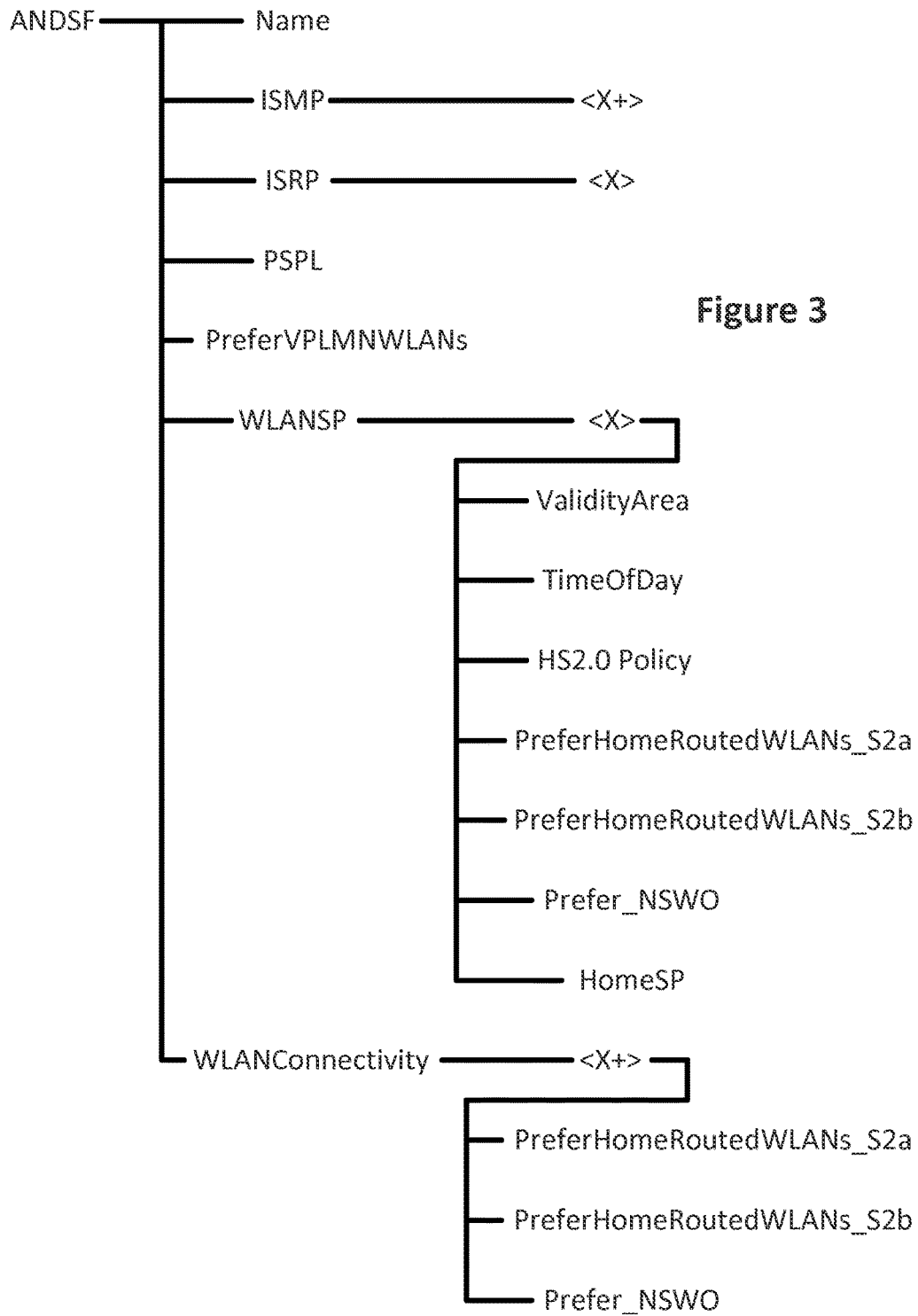
FIG. 3 depicts an example of nodes defined in access network discovery and selection function (ANDSF), in accordance with various embodiments.

As noted above, in some embodiments the H-ANDSF 281 and/or a V-ANDSF (not shown) may provide one or more selection preference rules such as an ISMP rule, an ISRP rule, a WLANSP rule, or some other type of rule. In embodiments, additional nodes may be added to a rule to indicate operator preferences regarding WLAN selection preference. FIG. 3 depicts one example of rule(s) that may be generated by an ANDSF such as H-ANDSF 281 and/or a V-ANDSF (not shown). As shown, an ANDSF may provide a selection preference rule with a variety of nodes or parameters such as:

"Name," which may include a name of the ANDSF.
"ISMP," which may indicate that the selection preference rule is an ISMP selection preference rule as discussed above and which may have one or more additional parameters as indicated by the node <X+>.
"ISRP," which may indicate that the selection preference rule is an ISRP selection preference rule and which may have one or more additional parameters as indicated by the node <X>.
"PSPL," which may indicate a preferred service provider list.
"PreferVPLMNWLANs," which may be an indication to prefer WLANs with VPLMN connectivity.
"WLANSP," which may indicate that the selection preference rule is a WLANSP selection preference rule as described above.
"WLANConnectivity," which may include one or more connectivity rules or parameters related to one or more WLANs.
One or more additional or alternative nodes.

The WLANSP selection preference rule may have additional nodes as indicated by the node <X>. Specifically, the WLANSP selection preference rule may include nodes such as:

"ValidityArea," which may indicate a geographical location in which the WLANSP selection preference rule is valid.

"TimeOfDay," which may indicate a time of day in which the WLANSP selection preference rule is valid.

HS2.0 Policy, which may indicate parameters of a Hotspot 2.0 policy as described for example by the IEEE 802.11u standards.

"PreferHomeRoutedWLANs_S2a," which may indicate that the UE 206 should preferentially connect to WLAN APs that provide S2a connectivity to the HPLMN 248.

"PreferHomeRoutedWLANs_S2b," which may indicate that the UE 206 should preferentially connect to WLAN APs that provide S2b connectivity to the HPLMN 248.

"Prefer_NSWO," which may indicate that the UE 206 should preferentially connect to WLAN APs that provide NSWO access.

"HomeSP," which may indicate preferences of the Home Service Provider or Home Operator. These preferences may include a list of service providers preferred by Home operator in a prioritized order in roaming scenarios. They may also include preference rules based on different validity conditions such as location, time and access preference.

One or more additional or alternative nodes.

In some embodiments, the "PreferHomeRoutedWLANs_S2a," "PreferHomeRoutedWLANs_S2b," and "Prefer_NSWO" nodes may additionally or alternatively be elements of the WLANConnectivity node, as shown in FIG. 3.

As discussed above, in some embodiments UE 206 may transmit a query such as an access network query protocol (ANQP) query to one or more of the WLAN APs 221, 230, or 239 regarding which PLMNs the various WLAN APs can connect to, and whether those PLMNs offer home routed services or visited services. The ANQP query may include a generic WLAN container through which the UE 206 may request one or more parameters or information about which PLMNs are supported through an interface such as an S2a interface, S2b interface, NSWO interface, etc.

In embodiments, ANQP queries or responses may include extensions that include elements that may support Hotspot 2.0 features. These elements may be defined for use in infrastructure basic service sets (BSSs), which may be considered to be the set of WLAN APs that may communicate with one another. For elements defined as part of ANQP extensions, a requesting device such as UE 206 may be considered a non-access point (non-AP) station (STA) or UE. The responding element that generates and transmits an ANQP response may be the WLAN AP such as WLAN AP 105.

Generally, ANQP elements may be defined to have a common format consisting of a 2-octet information identification (Info ID) field that may include 16 bits of information, a 2-octet length field that may include another 16 bits of information, and a variable-length element-specific information field. Each element may be assigned a unique Info ID. In general, the IEEE 802.11 assigned numbers authority (ANA) may have provided 32 ANQP Info IDs possible that may be used for new ANQP elements in ANQP queries according to Hotspot 2.0 protocols as shown in following Table 1:

TABLE 1

New ANQP Info ID definitions

| ANQP Element Name | Info ID Value |
| --- | --- |
| Operator Friendly Name | <IEEE 802.11 ANA> |
| Hotspot wireless access network (WAN) metrics | <IEEE 802.11 ANA+1> |
| Hotspot Firewall Port Configuration Query | <IEEE 802.11 ANA+2> |
| Generic WLAN container | <IEEE 802.11 ANA+3> |
| Reserved | <IEEE 802.11 ANA+4 to ANA+31> |

Figure 4:
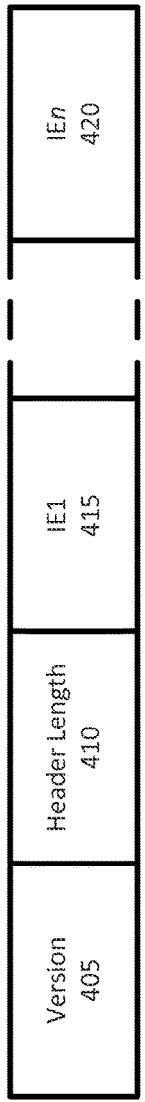
FIG. 4 depicts an example of a generic WLAN container, in accordance with various embodiments.

FIG. 4 depicts an example of a generic WLAN container 400. Specifically, the generic WLAN container 400 may include information that may allow a WLAN access network or WLAN AP such as WLAN AP 105 to connect to or communicate with the 3GPP EPC. In embodiments, the generic WLAN container 400 may be used in an ANQP query as described above to obtain information related to connectivity options or PLMN support of various WLAN APs. In some embodiments, the generic WLAN container 400 may be used to indicate one or more user preferences to a WLAN AP. In some embodiments, the generic WLAN container 400 may be used as part of an ANQP response by a WLAN AP to educate a UE 206 as to the connectivity options, PLMN support, or other parameters of a WLAN AP. In embodiments, the generic WLAN container 400 may include information such as APN the user of a UE such as UE 110 or 206 wishes to connect to, access to the Internet, access to the EPC, PDN-GW type, a user identifier such as an international mobile subscriber identity (IMSI) or a temporary mobile subscriber identity (TMSI), the type of connectivity options of the WLAN AP such as whether the WLAN AP supports an S2a interface, an S2b interface, etc.

The generic WLAN container 400 may include an Info ID field (not shown) that may be equivalent to IEEE 802.11 ANA+3 as shown in Table 1, above. Specifically, ANQP elements may be defined to have a common format consisting of a 2-octet Info ID field, a 2-octet length field, and a variable-length element-specific information field. Each element may be assigned a unique Info ID. A UE may send an ANQP query with Info ID set to <IEEE 802.11 ANA+3> to retrieve Generic WLAN container information from one or more PLMNs.

As shown in FIG. 4, the generic WLAN container 400 may include a version element 405. The version element may be one octet in length (e.g. including 8 bits of data). In embodiments, a data string of "0000000" may indicate version 1, and one or more of data strings of "00000001" to "11111111" may be reserved for future use.

The generic WLAN container 400 may further include a header length element 410, which may be two octets long (e.g. including 16 bits of data). The header length element 410 may define the number of octets that follow the header length element 410 in the generic WLAN container 400.

The generic WLAN container 400 may then include a number of information elements (IEs) such as IE1 415 to IEn 420. Generally, a first octet of an IE may be an IE identifier (IEI) that indicates what type of IE is provided, and then additional bits that indicate the length of the IE and then any other fields that are specific to that IE. The IEIs of some of the types of IEs, and the associated IEs, that may be used in generic WLAN container 400 are described in Table 2 as follows:

TABLE 2

IE descriptions

| Octet Value | IEI Name | IE Description |
|---|---|---|
| 00000000 | APN | The APN IE may specify the APN that the user of UE 206 wants to connect to. |
| 00000001 | PDN Type | The PDN Type IE may specify the type of addressing support by UE 206. (e.g., IPv4, IPv6, IPv4v6). The PDN-GW may allocate bearers accordingly. |
| 00000010 | Access Type | The Access Type IE may specify the access type provided by the WLAN AP. The WLAN AP may provide, for example, direct Internet access or access to the 3GPP EPC and other services. |
| 00000011 | Network Access Identifier (NAI) | The NAI IE may be used for authorizing the user. |
| 00000100 | Connectivity Options | The Connectivity Options IE may specify whether the WLAN AP supports S2a interfaces, S2b interfaces, NSWO interfaces, etc. |
| 00000101 | Support for Online Charging | The Support for Online Charging IE may indicate that the WLAN AP may be required to provide, or may support, online charging interactions for the UE 206. |
| 00000110 | Fully Qualified Domain Name (FQDN) of Online Charging System (OCS) Entity | The FQDN of OCS Entity IE may be the address of the OCS entity in case the trusted WLAN AP needs to support online charging interactions. |
| 00000111 | Protocol Configuration Options | The Protocol Configuration Options IE may be a container that could include options such as deferred IP allocation. Other options defined by 3GPP may be used. |
| 00001000 | Attach Type | The Attach Type IE may indicate whether the UE's connection to the WLAN AP is an initial attach or handover attach. |
| 00001001 | PLMN List | The PLMN List IE may provie an indication of connectivity options and/or supported PLMNs or services of a given WLAN. The PLMN List IE is described in further detail below. |
| 00001010-11111111 | Reserved | The octet values may be reserved for future use. |

It will be noted that the specific octet values or names of one or more of the IEs described above are intended as examples of one embodiment. In different embodiments certain octet values may be different for a given IE, or the names or characteristics of one or more of the IEs may be different from those depicted above in Table 2.

Figure 5:
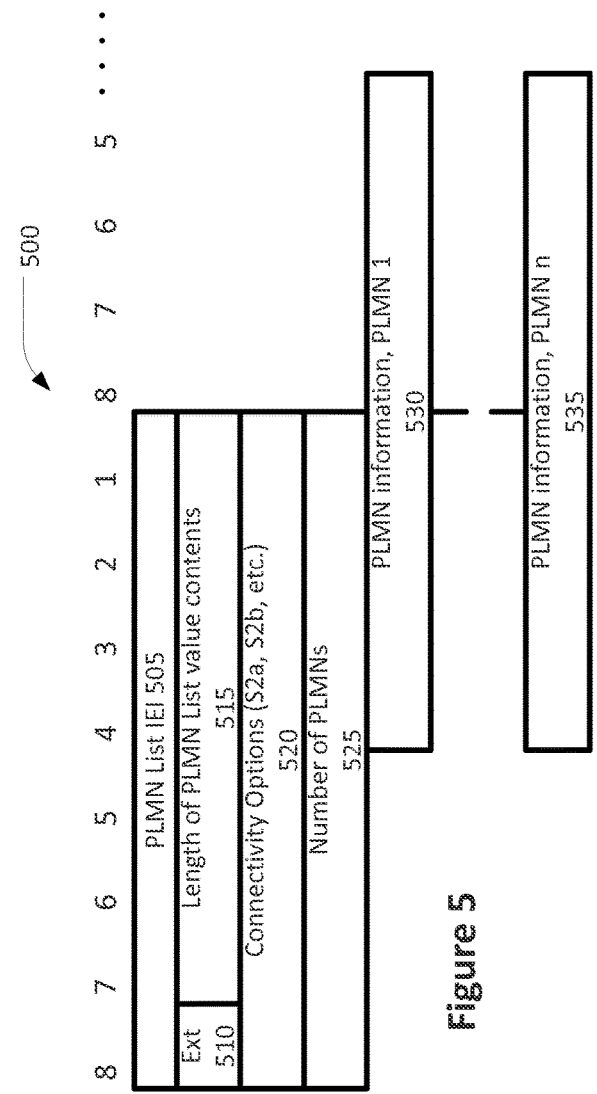
FIG. 5 depicts an example of a PLMN List information element (IE), in accordance with various embodiments.

As described in Table 2, the generic WLAN container 400 may further include a PLMN List IE 500, as depicted in FIG. 5. Specifically, the PLMN List IE 500 may provide information to the UE 206 regarding PLMNs such as HPLMN 248, VPLMN 251, or VPLMN 257 that are accessible or supported by a given WLAN AP such as WLAN APs 221, 230, 239 for different connectivity options. Specifically, the first octet of PLMN List IE 500 may include the PLMN List IEI 505 that may signal that the IE is a PLMN List IE 500, as described above with respect to the IEIs of generic WLAN container 400. The second octet may include a 1-bit extension 510 that may be used if the length of this IE exceeds beyond one octet. Specifically, if the 1-bit extension 510 it is set, then the length field may extend beyond the first octet to the next octet as well and the total length may be the sum of the length in first octet and the second octet and so on until the octet in which the 1-bit extension field is not set, which may imply that the length octet is the last length octet for the present IE. The remaining seven bits of the second octet may indicate a length of PLMN List value contents 515. That is, the length indication 515 may indicate the overall length of the PLMN List IE 500 in bits, octets, or some other length metric. The third octet may indicate the connectivity options (S2a, S2b, etc.) 520 through which the WLAN AP can connect to one or more PLMNs. In some embodiments, the second and third octets may be combined such that the extension 510, the length indication 515, and the connectivity options 520 may be combined into a single octet.

The next octet may indicate the number of PLMNs 525 which the WLAN AP can connect to or associate with. Further information may be provided in additional octets that indicate information related to one or more of the PLMNs that the WLAN AP can connect with. For example, the PLMN List IE 500 may include information related to a first PLMN 530 through an nth PLMN 535. The information may include a PLMN identifier, the type of services provided by the PLMN, whether the services are home routed or visited services, etc.

The PLMN List IE 500 depicted in FIG. 5 is one example embodiment, and in other embodiments the different elements or information may be arranged in a different order, may be a different length, etc. For example, even though the information related to the first PLMN 530 through an nth PLMN 535 are shown as offset and beginning at bit 4 of the octet, in other embodiments the information may be aligned with the other elements of the PLMN List IE 500 (e.g., beginning at bit 8), or some other bit. In embodiments, the PLMN List IE 500 may be included in an IEEE 802.11 beacon broadcast by one or more of the WLAN APs 221, 230, or 239, an ANQP response, or some other message or signal received by the UE 206.

Figure 6:
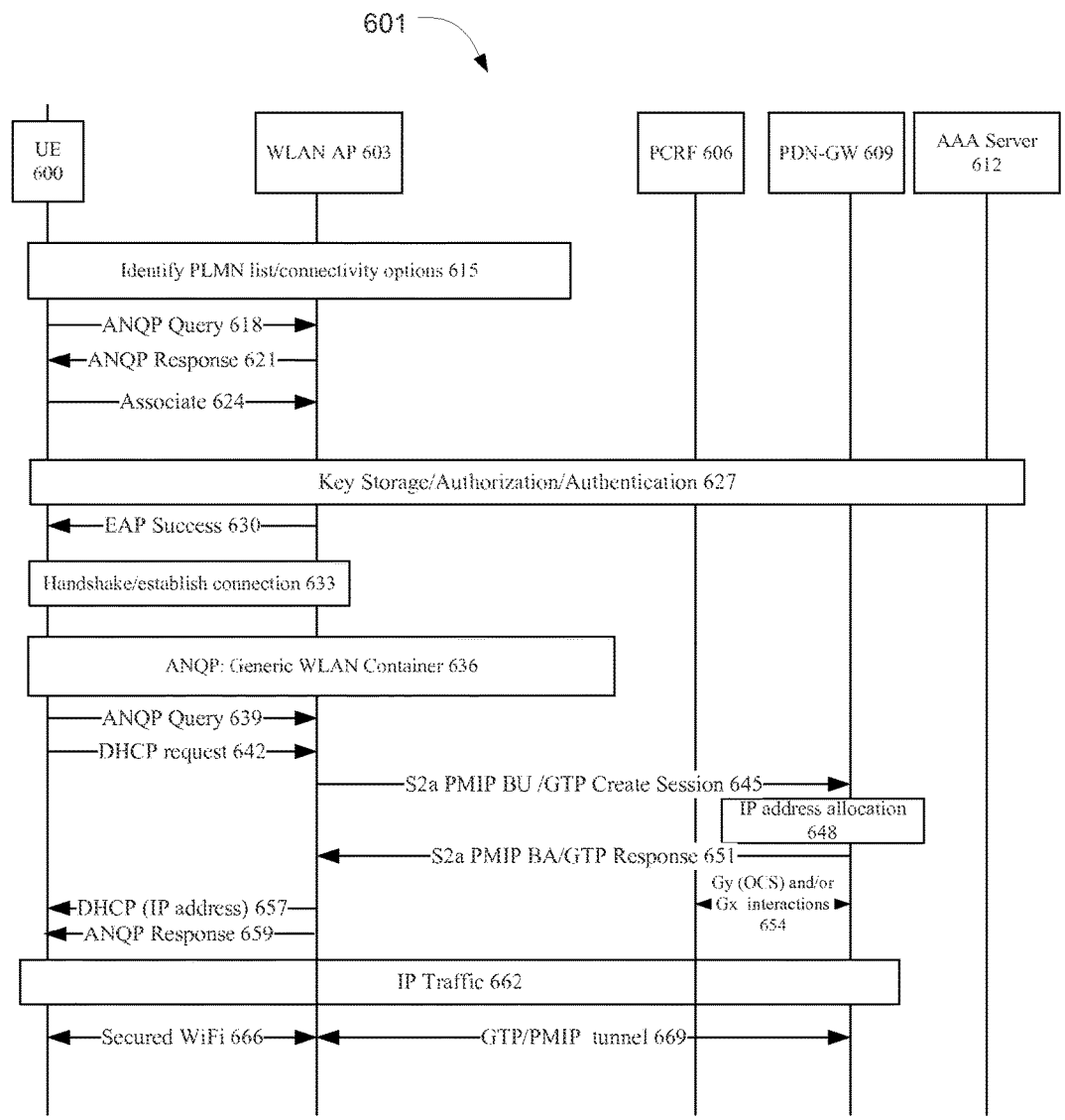
FIG. 6 depicts an example of a discovery and connection process, in accordance with various embodiments.

FIG. 6 depicts an example process by which a UE may identify the connectivity options and PLMN associations of one or more WLAN APs, and connect to a given WLAN AP based on the connectivity options, PLMN associations, and a selection preference rule. The network 601 in which the process is implemented may be, for example, a 3GPP network such as an LTE network. The network 601 may include a UE 600 that may be similar to UE 110 or 206. The network may further include a WLAN AP 603 that may be similar to one or more of WLAN APs 105, 221, 230, and 239. The network may further include a policy and charging rules function (PCRF) 606. The network 601 may further include a PDN-GW 609 that may be similar to one or more of PDN-GWs 242, 245, 254, and 260. The network 601 may further include an authentication/authorization/accounting (AAA) server 612.

Initially, the UE 600 and WLAN AP 603 may exchange information at 615 that the UE 600 may use to identify the PLMNs that the WLAN AP 603 can connect to, and the different connectivity options (S2a, S2b, etc.) that the WLAN AP 603 may use to connect to the PLMNs. As described above, the information may include one or more of an 802.11 beacon, an ANQP query, or an ANQP response. The exchanged information may further include a generic WLAN container 400 and/or a PLMN List IE 500, as described above. In some embodiments, if the UE 600 desires further information regarding the connectivity options and/or PLMN List of the WLAN AP 603, the UE 600 may send a query such as an ANQP query to the WLAN AP 603 at 618, which the WLAN AP 603 may answer with an ANQP response at 621. Based on the PLMN List, the connectivity options, and one or more selection preference rules, the UE 600 may associate with the WLAN AP 603 at 624.

Based on the association, the UE 600, WLAN AP 603, PCRF 606, PDN-GW 609, and AAA server 612 may perform a storage/authorization/authentication procedure at 627 that may include generation and storage of one or more keys or identification elements such as an IMSI, Multimedia Broadcast/Multimedia Service (MBMS) Service Key (MSK). The storage/authorization/authentication procedure at 627 may further include an extensible authentication protocol (EAP) authentication and key agreement (EAP-AKA) or AKA exchange. If the procedure at 627 is successful, the WLAN AP 603 may notify the UE 600 that the UE 600 is authenticated and authorized at 630. Based on this authentication, a handshake may be performed between the UE 600 and WLAN AP 603 at 633, and a connection between the UE 600 and WLAN AP 603 may be established.

In embodiments, the UE 600 may then desire more information related to the network 601 and/or the WLAN AP 603. The UE 600 may therefore transmit an additional query in a generic WLAN container 400 at 636. Additionally/alternatively, the WLAN AP 603 may transmit additional information to the UE 600 in a generic WLAN container 400 at 636. As part of, or in response to, this additional information at 636, the UE 600 may transmit an ANQP query to the WLAN AP 603 at 639 and also transmit a dynamic host configuration protocol (DHCP) request to the WLAN AP 603 at 642. In some embodiments, the ANQP query and DHCP request may be in the same message, while in other embodiments the ANQP query and DHCP request may be in different messages.

Based on the ANQP query at 639 and/or DHCP request at 642, the WLAN AP 603 may transmit a proxy mobile IP (PMIP) or general packet radio service (GRPS) tunneling protocol (GTP) message to PDN-GW 609 at 645. Specifically, the PMIP or GTP message may include an indication or request to create a communication session between the UE 600 and the PDN-GW 609 via WLAN AP 603. In embodiments, the message may be transmitted over the S2a interface, as indicated in FIG. 6, though in other embodiments the message may be transmitted over the S2b interface. Based on the message at 645, the PDN-GW 609 may allocate an IP address to the UE 600 at 648, and transmit a PMIP or GTP response message to the WLAN AP 603 at 651. In embodiments, the message at 651 may be transmitted over the S2a interface, though in other embodiments the message may be transmitted over an S2b interface. In embodiments, the PDN-GW 609 may further perform one or more interactions with the PCRF 606 at 654 over the Gy or Gx interfaces related to OCS services.

Upon receiving the PMIP or GTP response at 651, the WLAN AP 603 may transmit a DHCP response at 657 and/or an ANQP response at 659 to the UE 600. As described above, in embodiments the DHCP response and ANQP response may be in the same or different messages. The DHCP response at 657 may include one or more indications or information regarding the IP address that was allocated to the UE 600 by the PDN-GW 609 at 648. Based on the IP address, the UE 600 may commence transmission and/or reception of IP traffic to or from the PDN-GW 609 at 662. In embodiments, the IP traffic may be routed through or conveyed by the WLAN AP 603. Specifically, the traffic may be routed between the UE 600 and the WLAN AP 603 via a secure WiFi connection 666, and then the traffic may be routed between the WLAN AP 603 and the PDN-GW 609 via a GTP or PMIP tunnel 669.

The exact process and elements described above are examples of one embodiment, and other embodiments may use different protocols, or include one or more additional or alternative messages or communications between the various entities of the network 601. In some embodiments, fewer messages or communications may be used than are shown in FIG. 6. In some embodiments, certain messages may be combined with one another or otherwise occur concurrently with one another.

Figure 7:
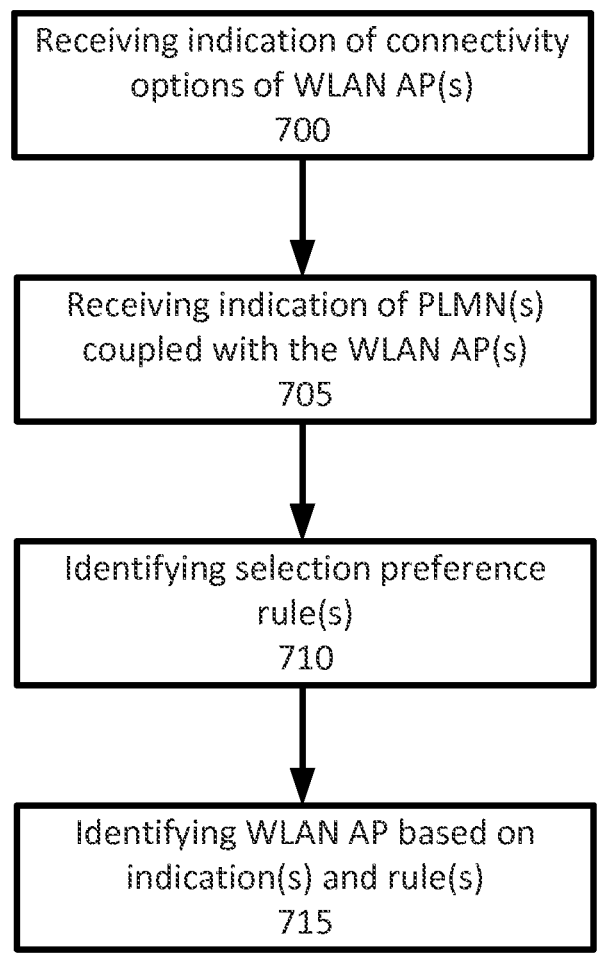
FIG. 7 depicts a high-level example of a discovery and connection process, in accordance with various embodiments.

FIG. 7 depicts a high-level example of a process flow for a discovery and connection process, in accordance with various embodiments. Specifically, FIG. 7 depicts a process that may be performed by a UE such as UE 110 or 206. Initially, the UE 206 may receive an indication of connectivity options of one or more WLAN AP(s) such as WLAN AP 105, 221, 230, and/or 239 at 700. The indication may be, for example, whether the WLAN AP(s) support an S2a interface, an S2b interface, an NSWO interface, etc. The indication may be, for example, received in an IEEE 802.11 beacon from the one or more WLAN APs, while in other embodiments the indication of connectivity options may be received in another signal.

The UE may then receive an indication of PLMN(s) that are coupled with one or more of the WLAN APs at 705. For example, the UE may receive an indication of whether the WLAN APs are able to couple with an HPLMN such as HPLMN 248 and/or a VPLMN such as VPLMN 251. In embodiments, the UE may also receive an indication of what services are options through each of the PLMNs, for example, whether each WLAN AP provides home routed services or visited services. The indication of PLMN(s) may be received in an IEEE 802.11 beacon, an ANQP response, or received from a TWAG of the one or more WLAN APs such as TWAGs 218, 227, or 236.

The UE may then identify one or more selection preference rules at 710. As described above, the selection preference rules may be provisioned from the H-ANDSF 281 and/or a V-ANDSF. In some embodiments, the selection preference rule(s) may be pre-provisioned in the UE, or the UE may request the selection preference rule(s). The selection preference rule(s) may be, for example, a WLANSP rule, an ISMP rule, an ISRP rule, or some other rule.

The UE may then identify a WLAN AP with which the UE should couple based on the indications received at 700 and 705 and the selection preference rule(s) identified at 715. In some embodiments, certain elements of the process may be performed in an order that is different than that listed in FIG. 7. For example, in some embodiments the indication of PLMN(s) may be received at 705 prior to receiving the indication of connectivity options at 700. Similarly, the identification of the selection preference rule(s) at 710 may be received prior to receiving one or both of the indications at 700 and/or 705. Additionally, in some embodiments one or more additional and/or alternative elements may be performed in conjunction with or instead of elements 700, 705, 710, or 715.

Figure 8:
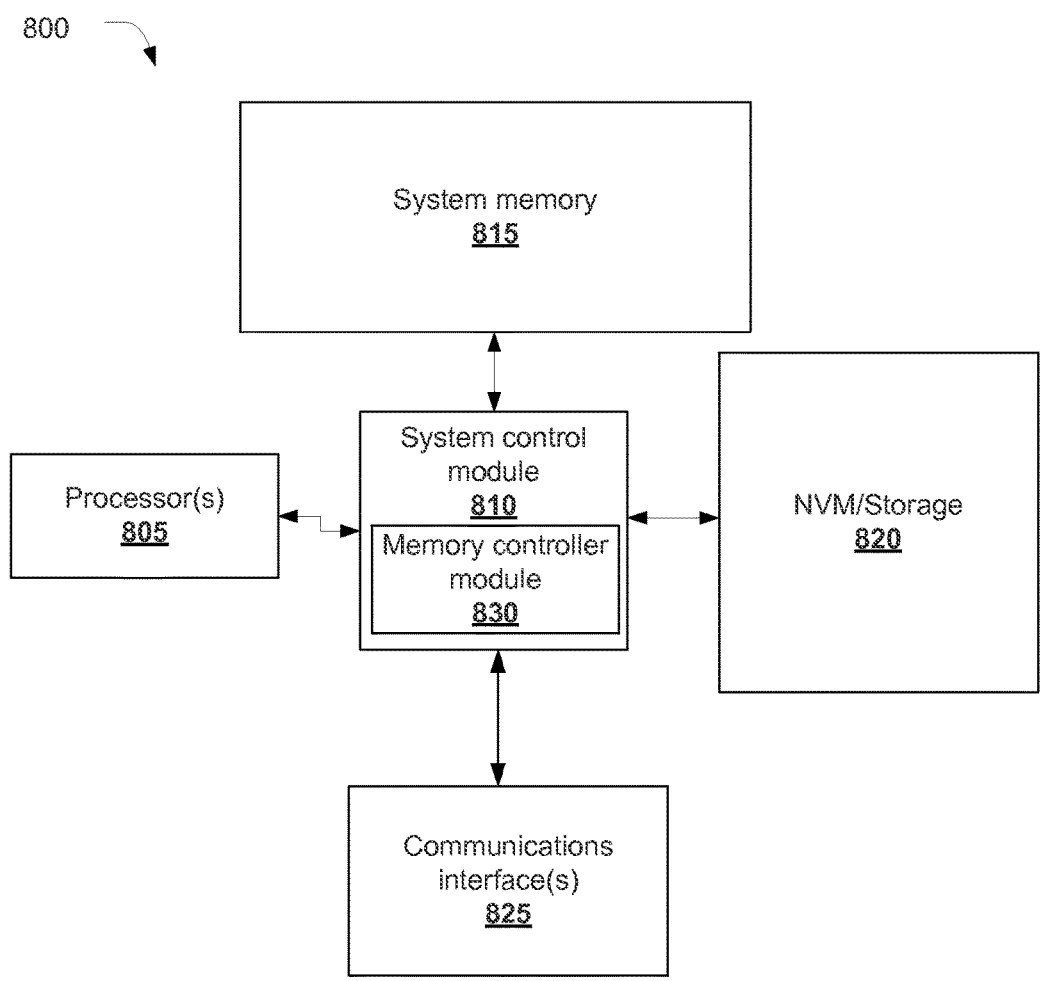
FIG. 8 schematically illustrates an example system that may be used to practice various embodiments described herein.

Embodiments of the present disclosure may be implemented into a system using any suitable hardware and/or software to configure as desired. FIG. 8 schematically illustrates an example system 800 that may be used to practice various embodiments described herein. FIG. 8 illustrates, for one embodiment, an example system 800 having one or more processor(s) 805, system control module 810 coupled to at least one of the processor(s) 805, system memory 815 coupled to system control module 810, non-volatile memory (NVM)/storage 820 coupled to system control module 810, and one or more communications interface(s) 825 coupled to system control module 810.

In some embodiments, the system 800 may be capable of functioning as the UE 110 or 206 as described herein. In other embodiments, the system 800 may be capable of functioning as the WLAN APs 105, 221, 230, 239, PDN-GWs 242, 245, 254, 260, or NSWO-GW 263 as described herein. In some embodiments, the system 800 may include one or more computer-readable media (e.g., system memory or NVM/storage 820) having instructions and one or more processors (e.g., processor(s) 805) coupled with the one or more computer-readable media and configured to execute the instructions to implement a module to perform actions described herein.

System control module 810 for one embodiment may include any suitable interface controllers to provide for any suitable interface to at least one of the processor(s) 805 and/or to any suitable device or component in communication with system control module 810.

System control module 810 may include memory controller module 830 to provide an interface to system memory 815. The memory controller module 830 may be a hardware module, a software module, and/or a firmware module.

System memory 815 may be used to load and store data and/or instructions, for example, for system 800. System memory 815 for one embodiment may include any suitable volatile memory, such as suitable DRAM, for example. In some embodiments, the system memory 815 may include double data rate type four synchronous dynamic random-access memory (DDR4 SDRAM).

System control module 810 for one embodiment may include one or more input/output (I/O) controller(s) to provide an interface to NVM/storage 820 and communications interface(s) 825.

The NVM/storage 820 may be used to store data and/or instructions, for example. NVM/storage 820 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. In some embodiments, NVM/storage 820 may be coupled with the communication module 137, and the communication module 137 may be configured to store data such as a received selection preference rule or indications of PLMN connectivity or connectivity options in the NVM/storage 820.

The NVM/storage 820 may include a storage resource physically part of a device on which the system 800 may be installed or it may be accessible by, but not necessarily a part of, the device. For example, the NVM/storage 820 may be accessed over a network via the communications interface(s) 825.

Communications interface(s) 825 may provide an interface for system 800 to communicate over one or more network(s) and/or with any other suitable device. The system 800 may wirelessly communicate with the one or more components of the wireless network in accordance with any of one or more wireless network standards and/or protocols. In some embodiments the communications interface(s) 825 may include the transceiver modules 130 or 150.

For one embodiment, at least one of the processor(s) 805 may be packaged together with logic for one or more controller(s) of system control module 810, e.g., memory controller module 830. For one embodiment, at least one of the processor(s) 805 may be packaged together with logic for one or more controllers of system control module 810 to form a System in Package (SiP). For one embodiment, at least one of the processor(s) 805 may be integrated on the same die with logic for one or more controller(s) of system control module 810. For one embodiment, at least one of the processor(s) 805 may be integrated on the same die with logic for one or more controller(s) of system control module 810 to form a System on Chip (SoC).

In some embodiments the processor(s) 805 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or global positioning satellite (GPS) circuitry (not shown).

In various embodiments, the system 800 may be, but is not limited to, a server, a workstation, a desktop computing device, or a mobile computing device (e.g., a laptop computing device, a handheld computing device, a tablet, a netbook, a smartphone, a gaming console, etc.). In various embodiments, the system 800 may have more or fewer components, and/or different architectures. For example, in some embodiments, the system 800 includes one or more of a camera, a keyboard, liquid crystal display (LCD) screen (including touch screen displays), non-volatile memory port, multiple antennas, graphics chip, application-specific integrated circuit (ASIC), and speakers.

EXAMPLES

Example 1 may include a user equipment (UE) comprising: receive circuitry to: receive an indication of a supported connectivity option of a wireless local area network (WLAN) access point (AP); and receive an indication of a public land mobile network (PLMN) that the WLAN AP is communicatively coupled with via the supported connectivity option; and WLAN circuitry coupled with the receive circuitry, the WLAN circuitry to: identify an active selection preference rule; and identify, based on the active selection preference rule, the indication of the supported connectivity option, and the indication of the PLMN, the WLAN AP as a target to which the UE is to communicatively couple.

Example 2 may include the UE of example 1, wherein the active selection preference rule is an inter-system routing policy (ISRP) rule and the receive circuitry is further to receive the ISRP from a home access network discovery and selection function (H-ANDSF) or a visited ANDSF (V-ANDSF).

Example 3 may include the UE of example 1, wherein the connectivity option is an S2a interface, an S2b interface, a non-seamless WLAN offload (NSWO) interface, or a local breakout.

Example 4 may include the UE of any of examples 1-3, wherein the indication of the PLMN includes an indication related to a service of the PLMN.

Example 5 may include the UE of example 4, wherein the receive circuitry is to receive the indication related to the service of the PLMN or the indication of the supported connectivity option in an advertisement beacon from the WLAN AP.

Example 6 may include the UE of any of examples 1-3, wherein the UE further includes transmit circuitry coupled with the receive circuitry, the transmit circuitry to transmit an access network query protocol (ANQP) query to the WLAN AP; and the receive circuitry is further to receive the indication of the PLMN in an ANQP response that is based on the ANQP query; wherein the ANQP query or the ANQP response includes an indication related to a PLMN parameter of the WLAN AP.

Example 7 may include the UE of example 6, wherein the indication related to the PLMN parameter of the WLAN AP includes an access point name (APN) information element (IE), a packet data network (PDN) type IE, an access type IE, a network access identifier (NAI) IE, a connectivity options IE, a support for online charging IE, a fully qualified domain name (FQDN) of online charging system (OCS) entity IE, a protocol configuration options IE, an attach type IE, or a PLMN List IE.

Example 8 may include the UE of any of examples 1-3, wherein the UE includes a baseband processor coupled with the WLAN circuitry.

Example 9 may include a method comprising: receiving, by a user equipment (UE), an indication of a supported connectivity option of a wireless local area network access point (WLAN AP) in a plurality of WLAN APs; receiving, by the UE, an indication related to a PLMN that the WLAN AP is communicatively coupled with via the supported connectivity option; and identifying, by the UE based on the indication of the supported connectivity option, the indication related to the PLMN, and an active selection preference rule, that the UE should communicatively couple with the WLAN AP.

Example 10 may include the method of example 9, wherein the supported connectivity option is an S2a interface.

Example 11 may include the method of example 9, wherein the active selection preference rule is an inter-system routing policy (ISRP) rule received from a home access network discovery and selection function (H-ANDSF) or a visited ANDSF (V-ANDSF).

Example 12 may include the method of any of examples 9-11, further comprising receiving, by the UE, the indication of the supported connectivity option or the indication related to the PLMN in an advertisement beacon from the WLAN AP.

Example 13 may include the method of any of examples 9-11, further comprising receiving, by the UE, the indication related to the PLMN in an access network query protocol (ANQP) response from the WLAN AP.

Example 14 may include the method of example 13, wherein the ANQP response includes an access point name (APN) information element (IE), a packet data network (PDN) type IE, an access type IE, a network access identifier (NAI) IE, a connectivity options IE, a support for online charging IE, a fully qualified domain name (FQDN) of online charging system (OCS) entity IE, a protocol configuration options IE, an attach type IE, or a PLMN List IE.

Example 15 may include the method of example 13, wherein the indication related to the PLMN is an indication related to a service of the PLMN.

Example 16 may include a wireless local area network (WLAN) access point (AP) comprising: transmit circuitry to: transmit an indication of a supported connectivity option of the WLAN AP; and transmit an indication related to a public land mobile network (PLMN) that the WLAN is communicatively coupled with; and receive circuitry coupled with the transmit circuitry, the receive circuitry to receive, from a user equipment (UE) based on the indication of the supported connectivity option, the indication related to the PLMN, and an active network selection rule of the UE, a request to connect with the UE.

Example 17 may include the WLAN AP of example 16, wherein the transmit circuitry is to transmit the indication of the supported connectivity option or the indication related to the PLMN in an advertisement beacon.

Example 18 may include the WLAN AP of examples 16 or 17, wherein the transmit circuitry is to transmit the indication related to the PLMN in an access network query protocol (ANQP) response.

Example 19 may include the WLAN AP of example 18, wherein the ANQP response includes an access point name (APN) information element (IE), a packet data network (PDN) type IE, an access type IE, a network access identifier (NAI) IE, a connectivity options IE, a support for online charging IE, a fully qualified domain name (FQDN) of online charging system (OCS) entity IE, a protocol configuration options IE, an attach type IE, or a PLMN List IE.

Example 20 may include the WLAN AP of examples 16 or 17, wherein the connectivity option is an S2a interface, an S2b interface, or a non-seamless WLAN offload (NSWO) interface.

Example 21 may include the WLAN AP of example 20, wherein the connectivity option is the S2a interface.

Example 22 may include a user equipment (UE) comprising: means to receive an indication of a supported connectivity option of a wireless local area network access point (WLAN AP) in a plurality of WLAN APs; means to receive an indication related to a PLMN that the WLAN AP is communicatively coupled with via the supported connectivity option; and means to identify, based on the indication of the supported connectivity option, the indication related to the PLMN, and an active selection preference rule, that the UE should communicatively couple with the WLAN AP.

Example 23 may include the UE of example 22, wherein the supported connectivity option is an S2a interface.

Example 24 may include the UE of example 22, wherein the active selection preference rule is an inter-system routing policy (ISRP) rule received from a home access network discovery and selection function (H-ANDSF) or a visited ANDSF (V-ANDSF).

Example 25 may include the UE of any of examples 22-24, further comprising means to receive the indication of the supported connectivity option or the indication related to the PLMN in an advertisement beacon from the WLAN AP.

Example 26 may include the UE of any of examples 22-24, further comprising means to receive the indication related to the PLMN in an access network query protocol (ANQP) response from the WLAN AP.

Example 27 may include the UE of example 26, wherein the ANQP response includes an access point name (APN) information element (IE), a packet data network (PDN) type IE, an access type IE, a network access identifier (NAI) IE, a connectivity options IE, a support for online charging IE, a fully qualified domain name (FQDN) of online charging system (OCS) entity IE, a protocol configuration options IE, an attach type IE, or a PLMN List IE.

Example 28 may include the UE of example 26, wherein the indication related to the PLMN is an indication related to a service of the PLMN.

Example 29 may include one or more non-transitory computer-readable media comprising instructions to cause a user equipment (UE), upon execution of the instructions by one or more processors of the UE, to: receive an indication of a supported connectivity option of a wireless local area network access point (WLAN AP) in a plurality of WLAN APs; receive an indication related to a PLMN that the WLAN AP is communicatively coupled with via the supported connectivity option; and identify, based on the indication of the supported connectivity option, the indication related to the PLMN, and an active selection preference rule, that the UE should communicatively couple with the WLAN AP.

Example 30 may include the one or more non-transitory computer-readable media of example 29, wherein the supported connectivity option is an S2a interface.

Example 31 may include the one or more non-transitory computer-readable media of example 29, wherein the active selection preference rule is an inter-system routing policy (ISRP) rule received from a home access network discovery and selection function (H-ANDSF) or a visited ANDSF (V-ANDSF).

Example 32 may include the one or more non-transitory computer-readable media of any of examples 29-31, further comprising instructions to receive the indication of the supported connectivity option or the indication related to the PLMN in an advertisement beacon from the WLAN AP.

Example 33 may include the one or more non-transitory computer-readable media of any of examples 29-31, further comprising instructions to receive the indication related to the PLMN in an access network query protocol (ANQP) response from the WLAN AP.

Example 34 may include the one or more non-transitory computer-readable media of example 33, wherein the ANQP response includes an access point name (APN) information element (IE), a packet data network (PDN) type IE, an access type IE, a network access identifier (NAI) IE, a connectivity options IE, a support for online charging IE, a fully qualified domain name (FQDN) of online charging system (OCS) entity IE, a protocol configuration options IE, an attach type IE, or a PLMN List IE.

Example 35 may include the one or more non-transitory computer-readable media of example 33, wherein the indication related to the PLMN is an indication related to a service of the PLMN.

Example 36 may include a method comprising: transmitting, by a wireless local area network (WLAN) access point (AP), an indication of a supported connectivity option of the WLAN AP; transmitting, by the WLAN AP, an indication related to a public land mobile network (PLMN) that the WLAN is communicatively coupled with; and receiving, by the WLAN AP from a user equipment (UE) based on the indication of the supported connectivity option, the indication related to the PLMN, and an active network selection rule of the UE, a request to connect with the UE.

Example 37 may include the method of example 36, further comprising transmitting, by the WLAN AP, the indication of the supported connectivity option or the indication related to the PLMN in an advertisement beacon.

Example 38 may include the method of examples 36 or 37, further comprising transmitting, by the WLAN AP, the indication related to the PLMN in an access network query protocol (ANQP) response.

Example 39 may include the method of example 38, wherein the ANQP response includes an access point name (APN) information element (IE), a packet data network (PDN) type IE, an access type IE, a network access identifier (NAI) IE, a connectivity options IE, a support for online charging IE, a fully qualified domain name (FQDN) of online charging system (OCS) entity IE, a protocol configuration options IE, an attach type IE, or a PLMN List IE.

Example 40 may include the method of examples 36 or 37, wherein the connectivity option is an S2a interface, an S2b interface, or a non-seamless WLAN offload (NSWO) interface.

Example 41 may include the method of example 40, wherein the connectivity option is the S2a interface.

Example 42 may include a wireless local area network (WLAN) access point (AP) comprising: means to transmit an indication of a supported connectivity option of the WLAN AP; means to transmit an indication related to a public land mobile network (PLMN) that the WLAN is communicatively coupled with; and means to receive, from a user equipment (UE) based on the indication of the supported connectivity option, the indication related to the PLMN, and an active network selection rule of the UE, a request to connect with the UE.

Example 43 may include the WLAN AP of example 42, further comprising means to transmit the indication of the supported connectivity option or the indication related to the PLMN in an advertisement beacon.

Example 44 may include the WLAN AP of examples 42 or 43, further comprising means to transmit the indication related to the PLMN in an access network query protocol (ANQP) response.

Example 45 may include the WLAN AP of example 44, wherein the ANQP response includes an access point name (APN) information element (IE), a packet data network (PDN) type IE, an access type IE, a network access identifier (NAI) IE, a connectivity options IE, a support for online charging IE, a fully qualified domain name (FQDN) of online charging system (OCS) entity IE, a protocol configuration options IE, an attach type IE, or a PLMN List IE.

Example 46 may include the WLAN AP of examples 42 or 43, wherein the connectivity option is an S2a interface, an S2b interface, or a non-seamless WLAN offload (NSWO) interface.

Example 47 may include the WLAN AP of example 46, wherein the connectivity option is the S2a interface.

Example 48 may include one or more non-transitory computer-readable media comprising instructions to cause a wireless local area network (WLAN) access point (AP), upon execution of the instructions by one or more processors of the WLAN AP, to: transmit an indication of a supported connectivity option of the WLAN AP; transmit an indication related to a public land mobile network (PLMN) that the WLAN is communicatively coupled with; and receive, from a user equipment (UE) based on the indication of the supported connectivity option, the indication related to the PLMN, and an active network selection rule of the UE, a request to connect with the UE.

Example 49 may include the one or more non-transitory computer-readable media of example 48, further comprising instructions to transmit the indication of the supported connectivity option or the indication related to the PLMN in an advertisement beacon.

Example 50 may include the one or more non-transitory computer-readable media of examples 48 or 49, further comprising instructions to transmit, by the WLAN AP, the indication related to the PLMN in an access network query protocol (ANQP) response.

Example 51 may include the one or more non-transitory computer-readable media of example 50, wherein the ANQP response includes an access point name (APN) information element (IE), a packet data network (PDN) type IE, an access type IE, a network access identifier (NAI) IE, a connectivity options IE, a support for online charging IE, a fully qualified domain name (FQDN) of online charging system (OCS) entity IE, a protocol configuration options IE, an attach type IE, or a PLMN List IE.

Example 52 may include the one or more non-transitory computer-readable media of examples 48 or 49, wherein the connectivity option is an S2a interface, an S2b interface, or a non-seamless WLAN offload (NSWO) interface.

Example 53 may include the one or more non-transitory computer-readable media of example 52, wherein the connectivity option is the S2a interface.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A user equipment (UE) comprising:
   receive circuitry to receive, in a public land mobile network (PLMN) list information element (IE), an indication of a PLMN with which a wireless local area network (WLAN) access point (AP) is to communicate via S2a connectivity over an S2a interface between the WLAN AP and the PLMN; and
   WLAN circuitry coupled with the receive circuitry, the WLAN circuitry to:
   identify a WLAN selection policy (SP) of an access network discovery and selection function (ANDSF) management object (MO) and a preference indicator of the ANDSF MO, wherein the preference indicator is separated from the WLAN SP and preferences selection of WLAN with S2a connectivity; and
   select, based on the preference indicator and the indication of the PLMN in the PLMN list IE, the WLAN AP as a target to which the UE is to communicatively couple,
   wherein:
   the UE further includes transmit circuitry coupled with the receive circuitry, the transmit circuitry to:
   transmit an access network query protocol (ANQP) query to the WLAN AP; and
   establish, based on a selection of the WLAN AP as the target, a connection with the WLAN AP;
   the receive circuitry is further to receive the PLMN list IE in an ANQP response that is based on the ANQP query; and
   the ANQP query or the ANQP response includes an indication related to a PLMN parameter of the WLAN AP.

2. The UE of claim 1, wherein the WLAN SP is an inter-system routing policy (ISRP) rule and the receive circuitry is further to receive the ISRP from a home access network discovery and selection function (H-ANDSF) or a visited ANDSF (V-ANDSF).

3. The UE of claim 1, wherein the indication of the PLMN includes an indication related to a service of the PLMN.

4. The UE of claim 3, wherein the receive circuitry is to receive the PLMN list IE in an advertisement beacon from the WLAN AP.

5. The UE of claim 1, wherein the UE includes a baseband processor coupled with the WLAN circuitry.

6. A method comprising:
   identifying, by a user equipment (UE) from a wireless local area network (WLAN) access point (AP) in a plurality of WLAN APs, a received public land mobile network (PLMN) list information element (IE) that includes an indication related to a PLMN with which the WLAN AP is to communicate via S2a connectivity over an S2a interface between the WLAN AP and the PLMN;
   identifying a WLAN selection policy (SP) of an access network discovery and selection function (ANDSF) management object (MO) and a preference indicator of the ANDSF MO, wherein the preference indicator is separate from the WLAN SP and preferences selection of WLAN with S2a connectivity;
   selecting, by the UE based on the preference indicator and the indication related to the PLMN, the WLAN AP as a WLAN AP to which the UE should communicatively couple;
   receiving, by the UE, the PLMN list IE in an access network query protocol (ANQP) response from the WLAN AP;
   establishing, by the UE based on the selecting the WLAN AP, a connection with the WLAN AP.

7. method of claim 6, wherein the WLAN SP is an inter-system routing policy (ISRP) rule received from a home access network discovery and selection function (H-ANDSF) or a visited ANDSF (V-ANDSF).

8. The method of claim 6, further comprising receiving, by the UE, the PLMN list IE in an advertisement beacon from the WLAN AP.

9. The method of claim 6, wherein the indication related to the PLMN is an indication related to a service of the PLMN.

10. One or more non-transitory computer-readable media comprising instructions to cause a user equipment (UE), upon execution of the instructions by one or more processors of the UE, to:
- receive, from a wireless local area network (WLAN) access point (AP) in a plurality of WLAN APs, a public land mobile network (PLMN) list information element (IE) that includes an indication related to a PLMN with which the WLAN AP is to communicate via S2a connectivity over an S2a interface between the WLAN AP and the PLMN;
- identify a WLAN selection policy (SP) of an access network discovery and selection function (ANDSF) management object (MO) and a preference indicator of the ANDSF MO, wherein the preference indicator is separate from the WLAN SP and preferences selection of WLAN with S2a connectivity;
- select, based on the preference indicator and the indication related to the PLMN, the WLAN AP as a WLAN AP to which the UE should communicatively couple;
- receive the IE in an access network query protocol (ANQP) response from the WLAN AP; and
- establish, by the UE based on the selection of the WLAN AP, a connection with the WLAN AP.

11. The one or more non-transitory computer-readable media of claim 10, wherein the WLAN SP is an inter-system routing policy (ISRP) rule received from a home access network discovery and selection function (H-ANDSF) or a visited ANDSF (V-ANDSF).

12. The one or more non-transitory computer-readable media of claim 10, wherein the instructions are further to receive the PLMN list IE in an advertisement beacon from the WLAN AP.

13. The one or more non-transitory computer-readable media of claim 10, wherein the indication related to the PLMN is an indication related to a service of the PLMN.

* * * * *